United States Patent [19]
Stackman et al.

[11] 3,897,402
[45] July 29, 1975

[54] HIGH TEMPERATURE POLYIMIDES FROM 2,3-DIACYLSUCCINIC ACID DIESTER WITH DIAMINES

[75] Inventors: Robert W. Stackman, Morristown, N.J.; Donald W. Sargent, Schenectady, N.Y.

[73] Assignee: Celanese Corporation, New York, N.Y.

[22] Filed: Aug. 24, 1973

[21] Appl. No.: 391,396

Related U.S. Application Data

[63] Continuation-in-part of Ser. No. 143,674, May 12, 1971, abandoned.

[52] U.S. Cl. ...... 260/78 A; 117/161 P; 260/30.8 R; 260/47 CZ; 260/47 CP; 260/63 N; 260/65; 260/78 R; 260/78 TF; 260/326.25; 260/326.46
[51] Int. Cl. ..................... C08g 20/04; C08g 20/20
[58] Field of Search.......... 260/78 A, 78 TF, 47 CZ, 260/47 CP, 63, 65, 78 R

[56] References Cited
OTHER PUBLICATIONS

Hollins, Synthesis of Nitrogen Ring Compounds, 1924, pp. 28–33.
Piattelli et al., Chemical Abstracts, Vol. 62 (1965) col. 1621–1622.
Stern et al., Chemical Abstracts, Vol. 27 (1933) p. 4796.
Vasserman et al., Chemical Abstracts, Vol. 33 (1939) col. 7665–7666.
Knorr, Annalen der Chemie, 1886, Bände 236, pp. 296–317.

*Primary Examiner*—Harold D. Anderson

[57] ABSTRACT

Polyimides which are stable at temperatures up to about 450°C. to 500°C. and which are useful for high temperature applications are prepared by reacting 2,3-diacylsuccinic diesters with diamines in a 1:1 molar ratio. Polyimides are also produced by reacting 2,3-diacylsuccinic diesters with diamines in a 2:1 molar ratio to form bis(pyrrole-3,4-diesters), hydrolysing the tetraesters to form the corresponding bis(pyrrole-3,4-dicarboxylic acids), dehydrating the tetracarboxylic acids to form the corresponding bis(pyrrole-3,4-anhydrides), reacting the dianhydrides with aliphatic or aromatic diamines to form poly-(amic acids), and thermally cyclizing the poly-(amic acids) to form polyimides. Alternatively, the aforementioned tetraesters, tetracarboxylic acids, and dianhydrides can each be reacted with bis(orthophenylenediamines) to form poly-(imidazopyrrolones) which are also useful for high-temperature applications.

9 Claims, No Drawings

HIGH TEMPERATURE POLYIMIDES FROM 2,3-DIACYLSUCCINIC ACID DIESTER WITH DIAMINES

CROSS REFERENCE TO RELATED APPLICATION

This is a continuation-in-part of U.S. application Ser. No. 143,674 filed May 12, 1971, now abandoned.

The invention relates to thermally stable polymers. More particularly, it relates to thermally stable polyimides and poly-(imidazopyrrolones) and to processes for producing same from novel precursors.

It is known that cyclic imides, such as succinimide and glutarimide, as disclosed in U.S. patent No. 3,309,365, can be made from succinic anhydride and glutaric anhydride, respectively. It is also known that anhydrides can be prepared from carboxylic acids, and that such acids can be prepared from esters. However, it has not heretofore been known that 2,3-diacylsuccinic diesters can be utilized for the production of useful polyimides, and poly(imidazopyrrolones).

Therefore, it is an object of the present invention to provide novel polyimides and poly-(imidazopyrrolones) which are useful for high temperature applications.

Another object is to provide novel compounds which are useful as precursors in the production of the novel polyimides and poly-(imidazopyrrolones) of this invention.

Yet another object is to provide processes for producing the aforementioned novel polyimides, poly-(imidazopyrrolones), and precursors thereof.

These and other objects as well as advantages of the present invention can be had by reference to the following detailed description and claims.

Broadly, the above objects are achieved according to the present invention by selectively reacting the ketonic carbonyl groups of a 2,3-diacylsuccinic diester (I) with a diamine (II) in a 1:1 molar ratio to form the N-substituted-pyrrole-3,4-diester (III):

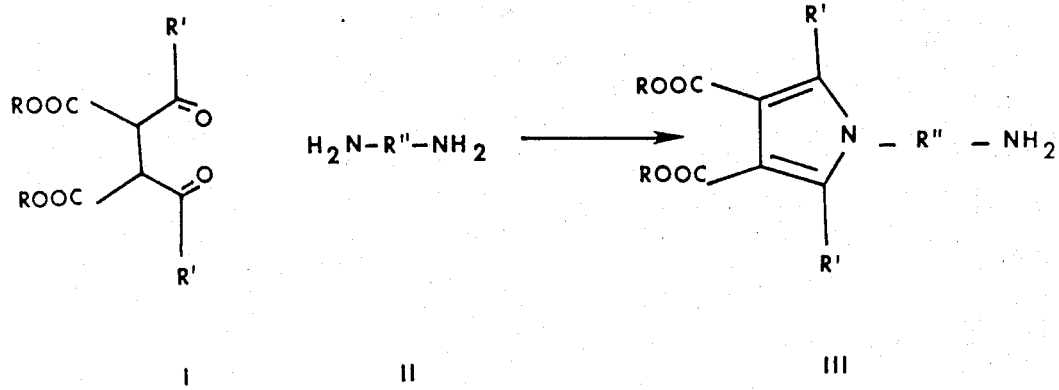

Upon heating, the pyrrole-3,4-diester (III) undergoes intermolecular amidation-cyclization to form polyimides comprising recurring units of the formula (IV):

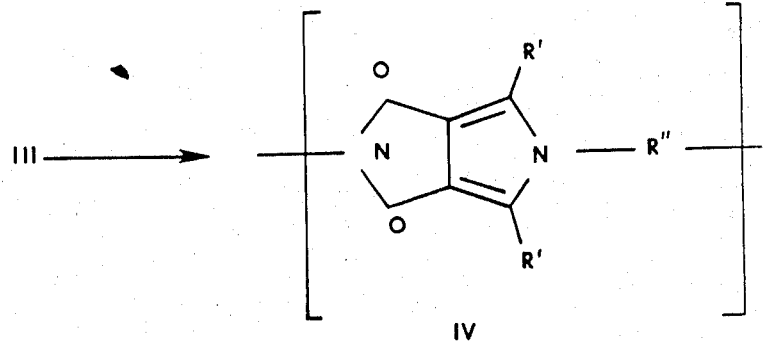

It is a feature of the present invention that polyimides can also be produced by selectively reacting the ketonic carbonyl groups of I with II in a 2:1 molar ratio to form a bis(pyrrole-3,4-diester) (V):

2 I + II ⟶

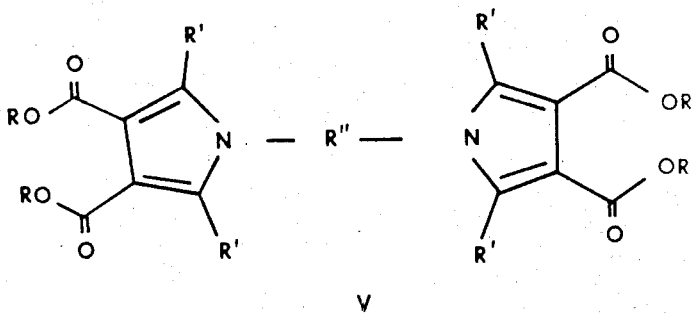

The bis(pyrrole-3,4-diester) (V) is then hydrolysed to form the corresponding bis(pyrrole-3,4-dicarboxylic acid) (VI):

The bis(pyrrole-3,4-anhydride) (VII) is reacted with a second diamine (VIII) to form a poly-(amic acid) comprising recurring units of the formula IX, which is then thermally cyclized to form a polyimide comprising recurring units of the formula X:

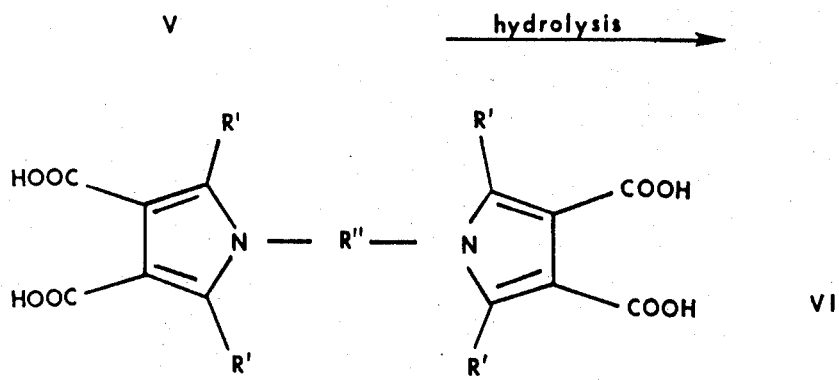

which in turn is dehydrated to form the corresponding bis-(pyrrole-3,4-anhydride) (VII):

VII +H$_2$N — R''' — NH$_2$ ⟶

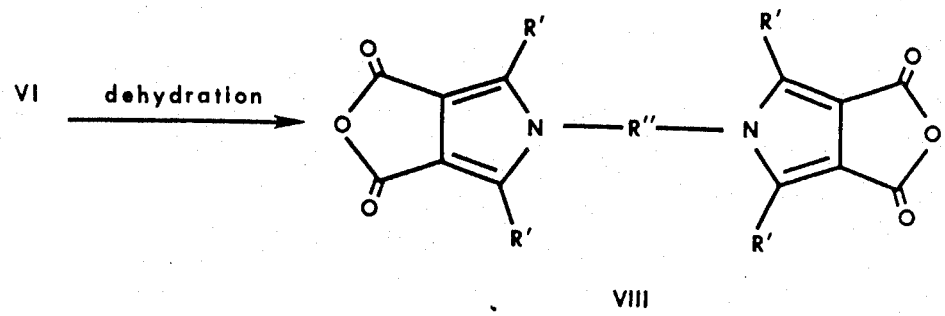

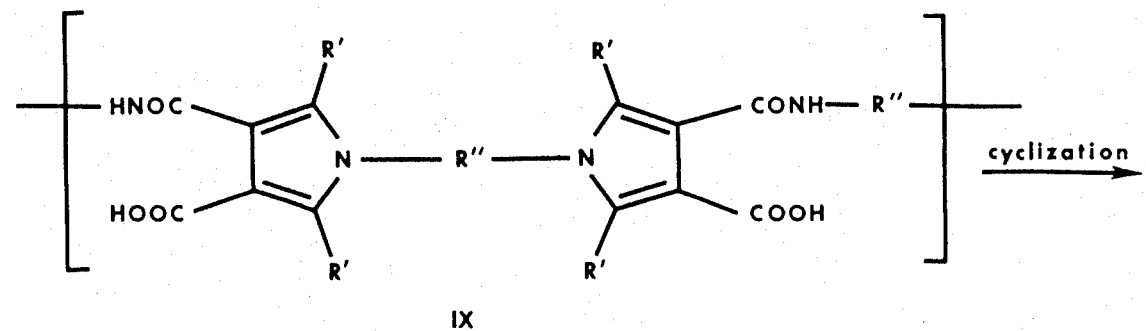

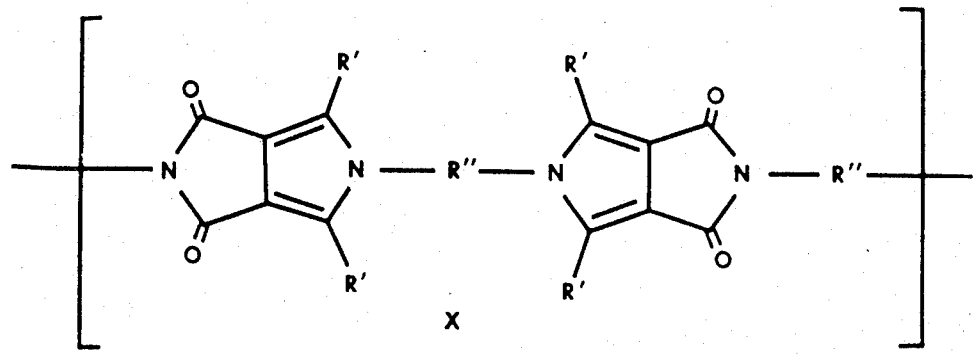

Another feature of the present invention is that the tetraesters (V) tetracarboxylic acids (VI), or dianhydrides (VII) can be each reacted with a bis(orthophenylene diamine) (XI) to form certain "ladder-type" high-temperature polymers referred to hereinafter as "poly-(imidazopyrrolones)" comprising recurring units of the formula XII:

and the like. R' is a hydrogen substituent or an organic substituent (including unsubstituted and substituted, saturated and unsaturated alkyl and aryl substituents) of between about 1 and about 10 carbon atoms, and preferably a lower alkyl substituent of between about 1 and about 6 carbon atoms such as methyl, ethyl, and the like.

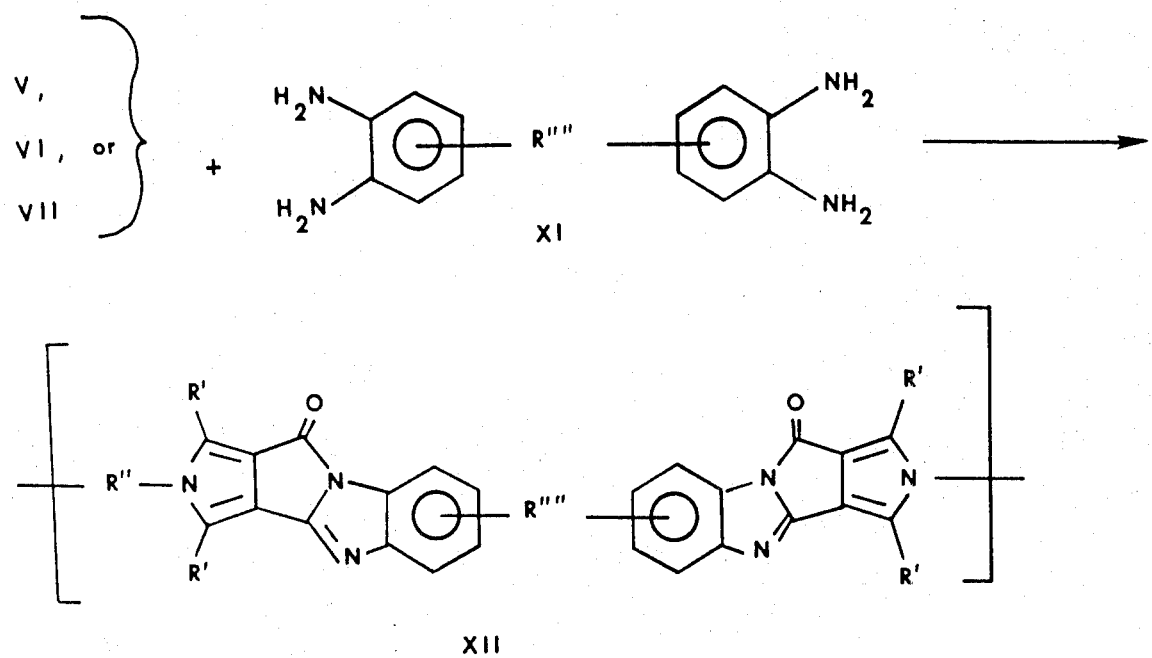

Each of the foregoing compounds is described more fully hereinbelow together with the process conditions necessary for effecting each step.

1. Formation of the 2,3-diacylsuccinic diesters (I)

In this known synthesis, an acylacetic ester is conventionally reacted with an alkali metal or alkali metal alcoholate (formed by reaction of an alcohol such as methanol, ethanol, or tert-butanol with an alkali metal such as sodium, potassium, or lithium) to form an alkali metal salt, which on further reaction with a halogen forms the 2,3-diacylsuccinic diester (I) as shown in the following equation:

The initial step of this two-step procedure can be conveniently conducted in the presence of a suitable organic solvent such as an alcohol or aromatic hydrocarbon (e.g., benzene, toluene) and initially at a temperature of between about 25°C. and about 50°C. Thereafter, during this step of the procedure, the mixture is heated at reflux, during which time hydrogen is evolved if the reaction is conducted with an alkali metal or alcohol is removed if the reaction is conducted with an alkali metal alcoholate.

In the second step of the synthesis, the mixture or slurry of the alkali metal salt of the acylacetic ester is

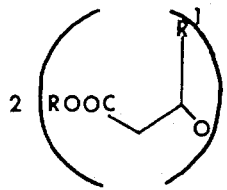 
1) alkali metal (or alkali metal alcoholate)
2) halogen
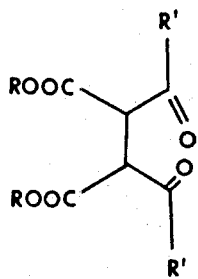

wherein R is an ester-forming substituent, desirably an organic ester-forming substituent of between about 1 and about 10 carbon atoms, and preferably a lower alkyl substituent of between about 1 and about 6 carbon atoms such as methyl, ethyl, propyl, iso-propyl, cooled to about 40°–60°C. and an equimolar amount of a halogen, such as chlorine, bromine or iodine, is added in small portions. After the ensuing coupling reaction is completed, the mixture is allowed to stand at ambient temperature and filtered to remove precipitated alkali metal halide. Evaporation of the filtrate yields the product which can be purified by conventional means, e.g., by crystallization.

According to the above procedure, for example, if the starting material is ethyl acetoacetate, the resulting product is diethyl 2,3-diacetylsuccinate.

The resulting 2,3-diacylsuccinic diester (I) is then reacted with a suitable diamine to form polyimides or bis(pyrrole-3,4-diesters) as described below.

2. Formation of the N-substituted pyrrole-3,4-diesters (III)

N-substituted pyrrole-3,4-diesters of the type III are produced according to the following reaction:

between about 50°C. and about 125°C., and preferably at the atmospheric reflux temperature of the system. During the reaction, water is evolved and can be removed by conventional means, e.g., by distillation. The resulting N-substituted pyrrole-3,4-diester (III) is isolated by conventional means after the dehydration reaction is completed. This material can then be polymerized to form polyimides of the type IV as described below.

3. Formation of the polyimides (IV)

N-substituted pyrrole-3,4-diesters (III) undergo thermal polymerization to form polyimides (IV) as shown in the following equation:

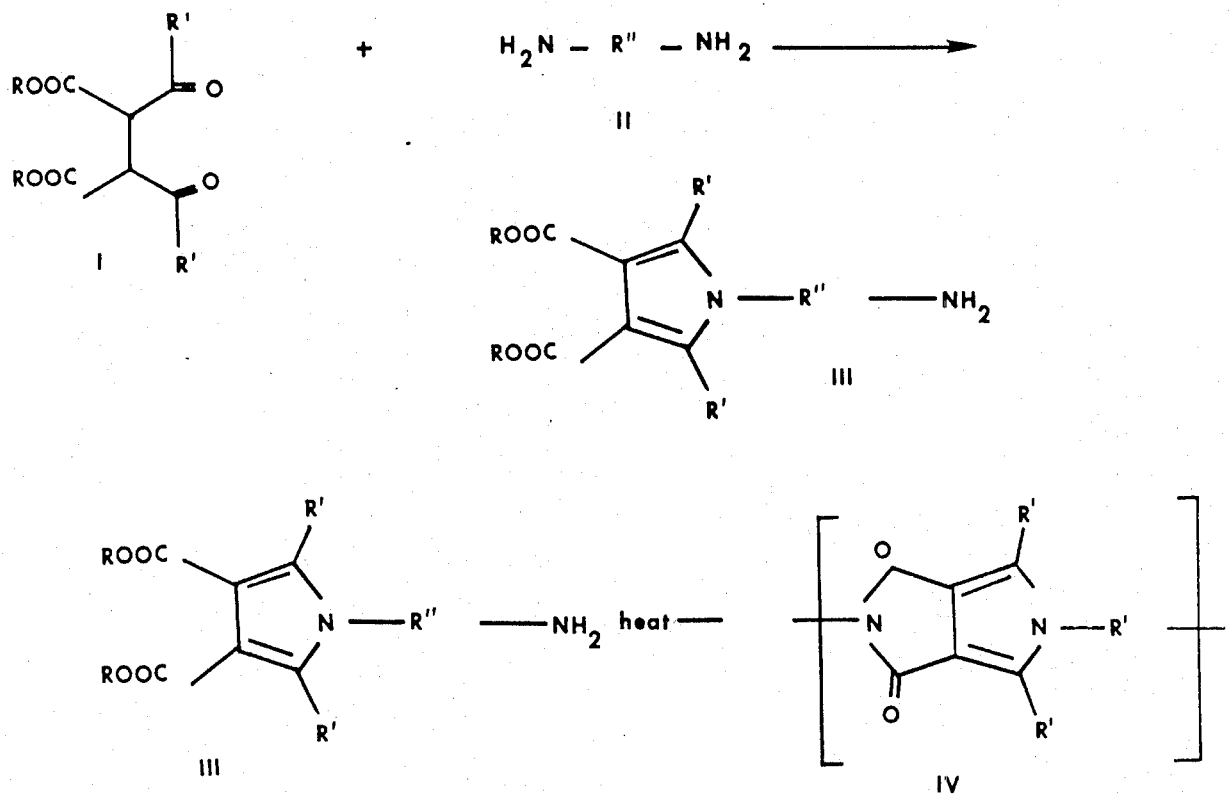

wherein R and R' are as defined heretofore and R" is an alkylene substituent of between 2 and about 10 carbon atoms (e.g., ethylene, trimethylene, and the like), and arylene substituent (e.g., phenylene, and the like), a biarylene substituent (e.g., biphenylene and the like), a diarylene substituent (e.g., diphenylene ether, diphenylene sulfone, diphenylene amine, and the like) or a covalent bond. Examples of diamines (II) suitable for use in the present invention include hydrazine, ethylene diamine, trimethylene diamine, para-phenylene diamine, benzidine, di-(para-aminophenyl)ether, di-(para-aminophenyl) sulfone, di-(para-aminophenyl) amine, and the like.

The reaction of I with II to give III is conducted according to the present invention by contacting them in a molar ratio of no more than about 1:1, respectively. Molar ratios substantially greater than about 1:1 will result in a product of lower purity. Preferably, 1:1 molar ratio is used. Such contacting is desirably conducted in a suitable dehydrating medium, e.g., glacial acetic acid and the like. The reaction is generally conducted at an elevated temperature, more particularly This transformation is accomplished by heating III above its melting point at a temperature which is generally above about 125° C., more particularly between about 125° C. and 300° C., and preferably between about 150° C. and 200° C. for a time sufficient to form the desired polymers. In most instances the heating time will range between about 30 minutes and ten hours, preferably one to five hours. It is desirable to bring III to the reaction temperature gradually; once the desired reaction temperature is attained, it is maintained thereat for a period of time depending on the degree of polymerization desired, a longer residence time at the reaction temperature resulting in a higher degree of polymerization. The reaction is preferably conducted in the presence of a high-boiling, condensation-promoting solvent, e.g., dimethylformamide, N-N-dimethylacetamide, dimethyl sulfoxide, hexamethylphosphoramide, N-methylpyrrolidone, and aromatic hydrocarbons which are liquids at the above-indicated temperatures.

During the polymerization, it is desirable to remove by-product alcohol, ROH, so as to drive the reaction toward the right (i.e., in favor of the polyimide). Upon completion of the reaction, the product can be isolated by distillation of solvent. The number of structural units in the polymer chain (i.e., the polymer chain length) is determined by the value of n, which value is at one end and a pyrrole-3,4-diester substituent at the other end.

4. Formation of the bis(pyrrole-3,4-diesters) (V):

The preparation of these intermediates is achieved according to the following equation:

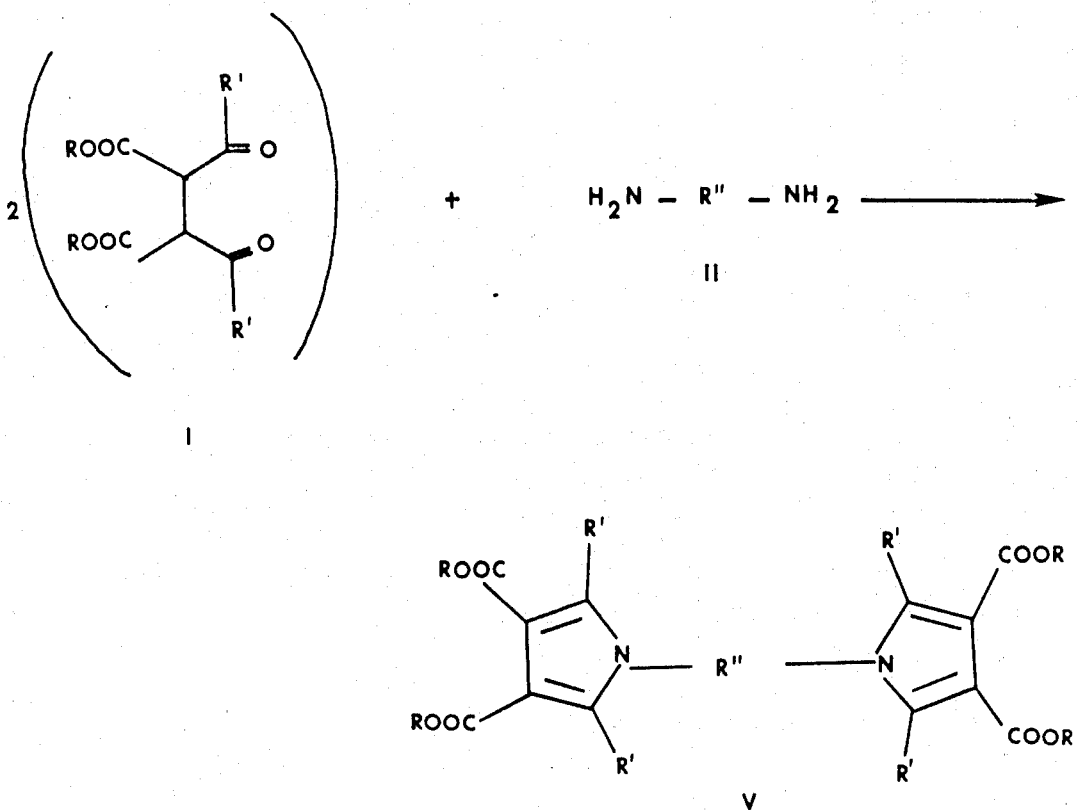

in turn reflected by the inherent viscosity of the polymer. Generally, polyimides (IV) produced according to the present invention have inherent viscosities of between about 0.15 and about 3.0, and preferably between about 0.16 and about 2.0. These inherent viscosities are determined on solutions of 0.1 gram of polymer/100 milliliters 97% $H_2SO_4$ at 25° C.

It is a feature of the present invention that, by use of the above-mentioned polymerization temperatures for the reaction between I and II in a 1:1 molar ratio, isolation of the intermediate monomer (III) can be avoided, thereby yielding polyimide (IV) directly by reaction between I and II. Using this approach, it is preferred that the mixture of monomers I and II be brought slowly to the desired polymerization temperature, e.g., over a period of several hours.

It is a further feature of the present invention that polyimides (IV) can be produced by applying a solution of III a solution of I and II in a suitable solvent (e.g., of the type described above) onto a surface and subsequently heating or baking the surface at the above-indicated temperatures to effect polymerization and to remove solvent. In this way, there is obtained a useful and desirable film or coating of IV on the aforementioned surface. The polyimides (IV) of the present invention are generally terminated by free amino substituents and pyrrole-3,4-diester substituents in equal amounts. That is, statistically, each molecule of polyimide (IV) will generally have a free amino substituent wherein R, R', and R'' are as defined heretofore.

The reaction of I with II to give V is conducted according to the present invention by contacting them in molar ratios of at least about 2:1, respectively, and preferably at a molar ratio of 2:1, respectively. The reaction is conducted at elevated (i.e., effective) temperatures, desirably between about 50°C. and about 150°C., and preferably at the atmospheric reflux temperature of a suitable dehydrating medium, such as glacial acetic acid and he like. During the reaction, water is evolved and can be removed by conventional means, e.g., by azeotropic distillation. The resulting bis(pyrrole-3,4-dicarboxylic ester)(V) can be isolated by distillation of solvent.

It is essential to the success of the present invention that the reaction between I and II be conducted in molar ratios which are either no greater than about 1:1 respectively (whereby III is produced) or less than about 2:1 respectively (whereby V is produced). The use of molar ratios of I to II of between substantially greater than about 1:1 and substantially less than about 2:1 will tend to result in undesirable mixtures of III and V.

The bis(pyrrole-3,4-diester) or tetraester (V) is converted to the corresponding tetracarboxylic acid (VI) by the hydrolysis reaction described below.

5. Formation of the bis(pyrrole-3, dicarboxylic acids)(VI)

The tetracarboxylic acids (VI) are formed from the tetraester (V) by hydrolysis according to the following equation:

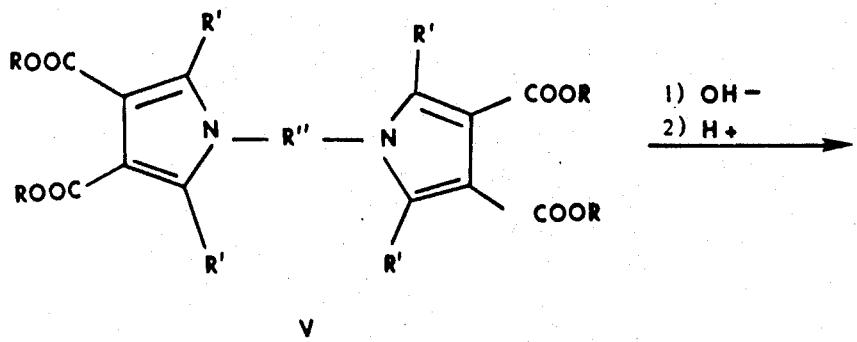

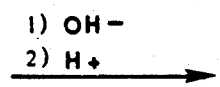

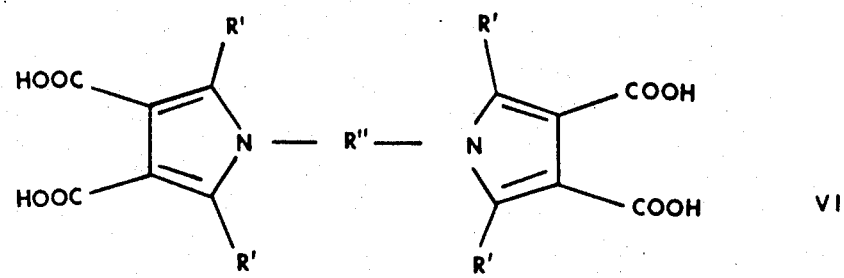

wherein R, R' and R'' are as defined heretofore.

This hydrolysis reaction is carried out by contacting V with an aqueous base such as aqueous alkali (e.g., NaOH, KOH, etc.). The reaction is preferably conducted in a solvent such as water or an aqueous lower alcohol such as aqueous ethanol. The reaction is preferably conducted at the atmospheric reflux temperature of the system and the excess alcohol and alcoholic by-product can be removed by distillation. When all the alcohol has been removed, the tetracarboxylate salt is neutralized with mineral acid and the precipitated tetracarboxylic acid (VI) is recovered by filtration with purification as desired (e.g., recrystallization from a suitable solvent).

The tetracarboxylic acid (VI) is then dehydrated to form the bis(pyrrole-3,4-anhydride) (VII) as described below.

6. Formation of the bis(pyrrole-3,4-anhydrides)(VII):

In this step, the tetracarboxylic acids (VI) are dehydrated to form the corresponding dianhydrides (VII) according to the following equation:

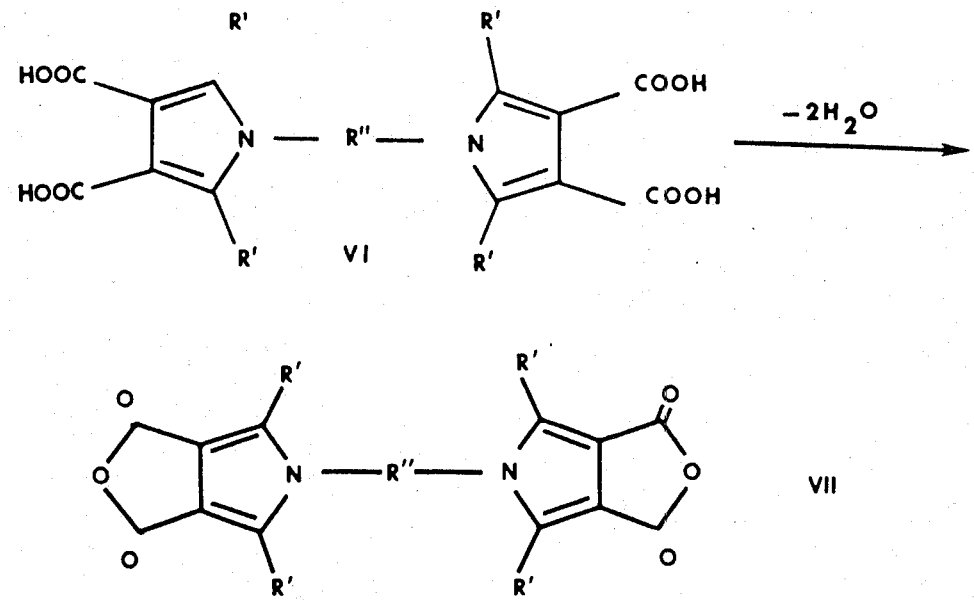

wherein R' and R'' are as defined heretofore.

This reaction is carried out by heating VI under dehydrating conditions as in a drying tube or with a dehydrating agent to remove water and form the dianhydride. In a preferred method, VI is contacted with an excess of acetic anhydride at reflux temperature from about 10 to about 50 hours to produce the dianhydrides (VII). The resulting precipitated product is then removed by filtration and conventionally purified as desired. This dianhydride is then used to form the poly-(amic acid) (IX), as described below.

7. Formation of poly-(amic acids) from bis(pyrrole-3,4-anhydrides):

In this aspect of the present invention, the dianhydride (VII) is reacted with a diamine (VIII) to produce a poly-(amic acid)(IX), according to the following equation:

about 3.0, and preferably between about 0.16 and about 2.0. These inherent viscosities are determined on solutions of 0.1 grams of polymer/100 milliliters 97% $H_2SO_4$ at 25°C.

The reaction is conducted by contacting VII with VIII in about a 1:1 molar ratio in a suitable solvent, such as dimethylformamide, N,N-dimethylacetamide, dimethylsulfoxide, hexamethylphosphoramide, N-

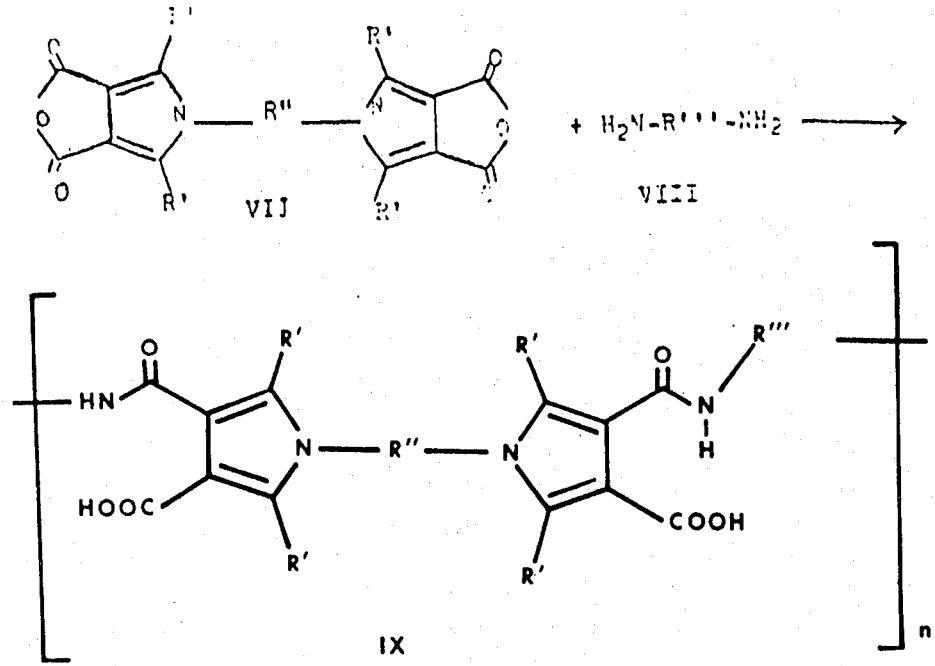

wherein R' and R" are as defined hereinabove, n is a positive integer representing the degree of polymerization, and R''' is an alkylene substituent of between 2 and about 10 carbon atoms (e.g., ethylene, trimethylene, and the like), an arylene substituent (e.g., phenylene and the like), a biarylene substituent (e.g., biphenylene and the like), a diarylene substituent (e.g., diphenylene ether, diphenylene sulfone, diphenylene amine, and the like), or a covalent bond. Examples of diamines (VIII) suitable for use in the present invention include hydrazine, ethylene diamine, trimethylene diamine, para-phenylene diamine, benzidine, di-(para-aminophenyl)ether, di-(para-aminophenyl)sulfone, di-(para-aminophenyl)amine, and the like.

The number of structural units in the polymer chain (i.e., the polymer chain length) is determined by the value of n, which value is in turn reflected by the inherent viscosity of the polymer. Generally, poly-(amic acids)(IX) product according to the present invention have inherent viscosities of between about 0.15 and methylpyrrolidone or any other condensation-promoting solvent for about one to eight hours at ambient temperatures and above. Temperatures of between about 40°C. and about 75°–100°C. are preferred; temperatures of above about 100°C. result in formation of polyimides (X). After the reaction is complete, the solvent can be removed and the resulting solid is recovered and purified. Alternatively, the solvent can be retained to permit further processing as desired. The product is found to be a polyamide with pendant carboxyl groups. During the reaction, ring closure to the imide occurs to some degree depending upon the temperature at which the reaction is carried out and therefore the resulting product is generally a mixture of the two compounds. As shown below, however, the poly-(amic acid)-polyimide mixture can be easily converted to the polyimide (X).

8. Formation of polyimides (X):

As set forth in the following equation, the poly-(amic acids) (IX), when heated, are converted to the corresponding polyimide (X):

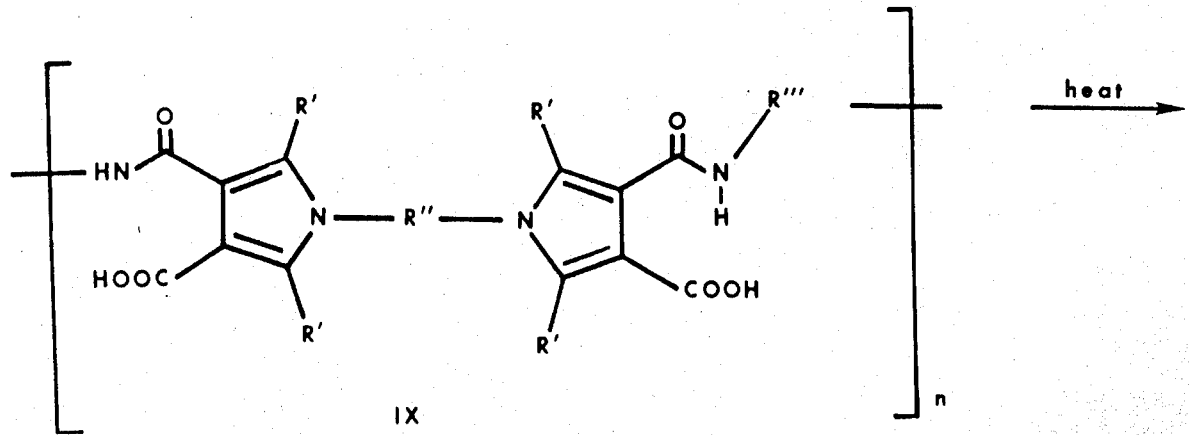

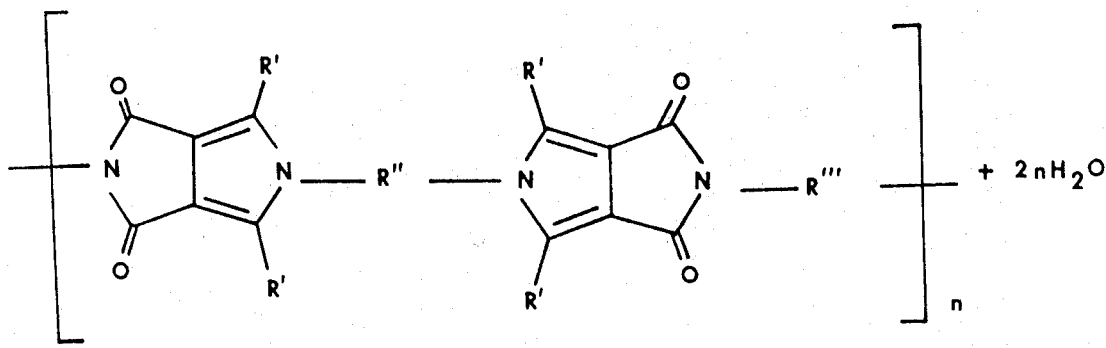

wherein R', R'' and R''' and n are as defined heretofore.

This reaction is effected by heating the poly-(amic acid) (IX) at a temperature of above about 100°C. and preferably between about 100°C. and about 300°C. The reaction can be conducted, partially at least, in the presence of a suitable high boiling solvent if desired, such as dimethylformamide, N,N-dimethylacetamide, N-methylpyrrolidone, dimethyl sulfoxide, and hexamethylphosphoramide. The reaction can be completed by continued heating to remove solvent and by-product water.

The number of structural units in the polymer chain (i.e., the polymer chain length) is determined by the value of n, which value is in turn reflected by the inherent viscosity of the polymer. Generally, polyimides (IV) produced according to the present invention have inherent viscosities of between about 0.15 and about 3.0, and preferably between about 0.16 and about 2.0. These inherent viscosities are determined on solutions of 0.1 gram of polymer/100 milliliters 97% $H_2SO_4$ at 25°C.

It is, of course, to be understood that by use of the higher temperatures, isolation of the intermediate poly-(amic acids) (IX) can be obviated, thus yielding X directly by reaction of VII with VIII. This reaction however must be conducted at temperatures of about 100°C. or above.

The identity of the end-groups of the poly-(amic acids) (IX) and polyimides (X) of the present invention depend upon the relative proportions of VII and VIII. Thus, if an excess of VII over VIII is employed, the poly-(amic acids) (IX) and polyimides (X) will be substantially "capped" with pyrrole-3,4-anhydride substituents. On the other hand, if an excess of VIII over VII is used, then IX and X will be substantially "capped" with amino substituents.

The conversion of the poly-(amic acids) (IX) to the symmetrical "head-to-head" polyimides (X) posesses the same features and aspects as the conversion of n-substituted pyrrole-3,4-diesters (III) to the likewise symmetrical but "head-to-tail" polyimides (IV), as discussed heretofore.

9. Formation of poly-(imidazopyrrolones) (XII):

It is a further feature of the present invention that the tetraesters (V), tetracarboxylic acids (VI) and dianhydrides (VII) disclosed above can be used to prepare poly-(imidazopyrrolones) (XII). Specifically, V, VI, or VII, or mixtures thereof, when dissolved in a suitable solvent, react with bis(ortho-phenylene diamines) (XI) to provide useful polymers (XII). Using the tetraester (III) of this invention for illustration, this reaction proceeds as follows:

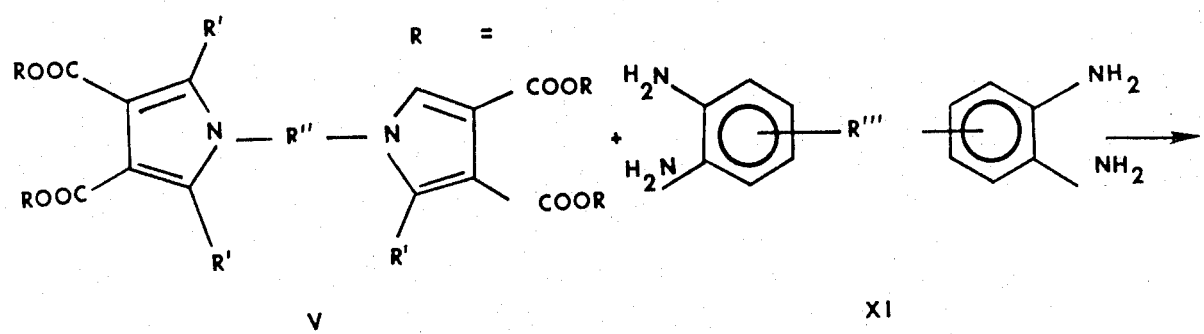

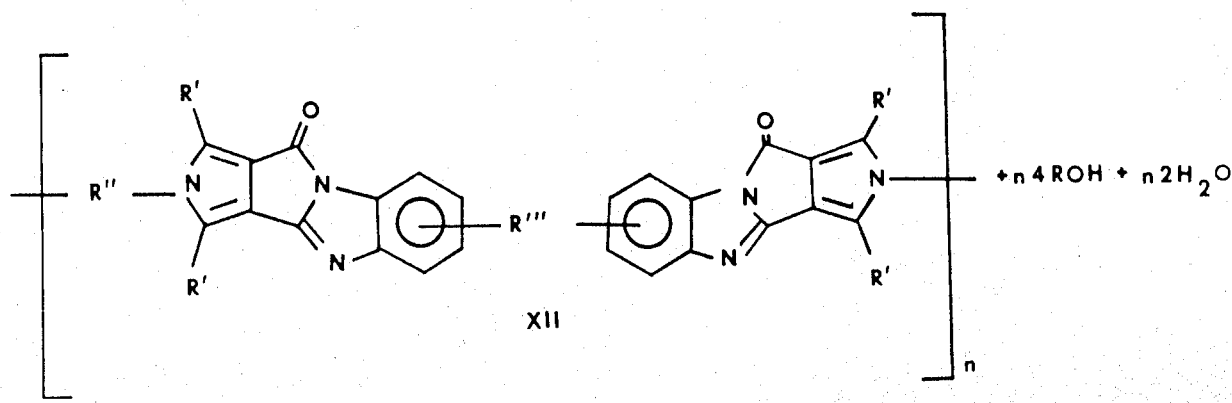

wherein R', R", and R''' and n are as described heretofore and R'''' is —O—, —SO$_2$—, an alkylene substituent of between about 1 and about 10 carbon atoms, —NH—, or a covalent bond.

This reaction is conducted by contacting a tetraester (V), tetracarboxylic acid (IV) or dianhydride (V), with the bis-(ortho-phenylene diamine) (XI) in the presence of polyphosphoric acid and a condensation-promoting solvent (if desired) at a temperature of between about 50°C. and about 250°C., and preferably between about 75°C. and about 200°C. Suitable solvents for this reaction include dimethylformamide, N,N-dimethylacetamide, N-methylpyrrolidone, dimethyl sulfoxide, hexamethylphosphoramide, and the like. The reaction normally requires extended periods of heating, after which time the mixture is cooled and the resulting solid recovered by conventional means, e.g., by filtration.

The number of structural units in the polymer chain (i.e., the polymer chain length) is determined by the value of $n$, which value is in turn reflected by the inherent viscosity of the polymer. Generally, polyimidazopyrrolones) (XII) produced according to the present invention have inherent viscosities of between about 0.15 and about 3.0, and preferably between about 0.16 and about 2.0. These inherent viscosities are determined on solutions of 0.1 gram of polymer/100 milliliters 97% $H_2SO_4$ at 25°C.

As shown in the foregoing equation, when a tetraester (V) is employed as the starting material, by-product alcohol and water are formed. On the other hand, when a tetracarboxylic acid (VI) or dianhydride (VII) is employed, only by-product water is formed.

The identity of the end-groups of the poly-(imidazopyrrolones) (XII) of the present invention depend upon the relative proportions of XI and V, VI, or VII. Thus, if an excess of XI over V, VI, or VII is employed, the poly(imidazopyrrolones), (XII) will be substantially "capped" with ortho-phenylene-diamine substituents. If, on the other hand, an excess of V, VI, or VII over XI is used, then XII will be capped with pyrrole-3,4-diester substituents, pyrrole-3,4-dicarboxylic acid substituents, or pyrrole-3,4-anhydride substituents, respectively.

It is a further feature of the present invention that poly-(imidazopyrrolones) (XII) can be produced by applying a solution of XI and V, VI, or VII, or mixtures thereof in a suitable solvent (e.g., of the type described above) onto a surface and subsequently heating or baking the surface at the above-indicated temperatures to effect polymerization and to remove solvent. In this way, there is obtained a useful and desirable film or coating of XII on the aforementioned surface.

Both the polyimides and the poly(imidazopyrrolones) of this invention are useful for the formation of filaments, fibers, films, and cast and compressed shaped articles, both solid and poromeric, such as coatings, gaskets, rods, and separators, which are useful for special high temperatures applications, methods for formation of these articles being well known by those skilled in the art. Examples of such products are gaskets and separators in high temperature pumping of liquids and compressing of gases, baffles and impellers in mixing of liquids, separators in chemical instrumentation, and coatings for electrical lines and pipes.

The polyimides of this invention are especially useful for forming strong and structurally stable fibers and films which can withstand temperatures of 450°–500°C. with negligible decomposition. Polymers which are useful at temperatures as high as 500°C. are few in number and extremely valuable for various uses, including coatings for high temperature surfaces which are encountered in rocketry, chemical processing and instrumentation.

The products and processes of the present invention are illustrated (but not limited) by the following specific examples.

EXAMPLE 1

Preparation of diethyl 2,3-diacetylsuccinate:

To a 12-liter, three-neck flask equipped with a stirrer, dropping funnel, thermometer, and Dean-Stark trap with condenser and drying tube, are added 216 grams (4.0 moles) of sodium methoxide and 6 liters of benzene. Five hundred and twenty grams (4.0 moles) of ethyl acetoacetate are then added through the dropping funnel over a period of one-half hour. During the addition, the reaction mixture thickens and the temperature rises from 24°C. to 35°C. Three liters of benzene are added during the course of the addition of the ethyl acetoacetate in order to keep the mixture stirrable. The system is then heated to reflux, and 550 ml. of a benzene-methanol azeotrope are removed. The thick white slurry is then cooled to 45°C., and 556 grams (4.0 moles) of iodine are added in small portions over a two-hour period.

The mixture is allowed to stand overnight and then filtered to remove the sodium iodide. The filtrate is evaporated to a brown, viscous oil. The oil is dissolved in a minimum amount of boiling absolute ethanol, and on cooling a white solid precipitates. The solid is recrystallized twice from absolute ethanol to give 240 grams of diethyl 2,3-diacetylsuccinate.

EXAMPLE 2

Preparation of p-amino-p'-(3,4-dicarbethoxy-2,5 dimethylpyrryl) biphenyl

To a 500 milliliter, three-neck flask equipped with a stirrer, reflux condenser, and Dean-Stark trap, are added 45.0 grams (0.175 mole) diethyl 2,3-diacetyl succinate, 30.6 grams (0.175 mole) benzidine and 100 milliliters glacial acetic acid. The mixture is stirred at reflux for 16 hours, and then cooled. The cooled reaction mixture is poured into water and neutralized with sodium bicarbonate. A golden-brown solid precipitate and is collected by filtration. The infra-red and nuclear magneticresonance spectra of this solid material confirms its structure as that of p-amino-p'-(3,4 dicarbethoxy-2,5-dimethylpyrryl)biphenyl. Yield: 40 grams (100% of theory based on either benzidine or diethyl 2,3-diacetylsuccinate).

EXAMPLE 3

Preparation of polyimide from p-amino-p'-(3,4 dicarbethoxy-2,5-dimethylpyrryl)biphenyl:

A sample of p-amino-p'-(3,4-dicarbethoxy-2,5 dimethylpyrryl)biphenyl prepared in Example 2 is heated in refluxing N,N-dimethylacetamide at 160°C for 5 hours. The infra-red spectrum of the resulting solid product is compatible with the polyimide structure. Thermogravimetric analysis shows only a small weight loss up to 475°C.

EXAMPLE 4

Preparation of p,p'-bis(3,4-dicarbethoxy-2,5-dimethylpyrryl) biphenyl:

To a 500 milliliter, three-neck flask, equipped with a stirrer, reflux condenser, and Dean-Stark trap, are added 45.0 grams (0.175 mole) diethyl 2,3-diacetylsuccinate, 14.0 grams (0.08 mole) benzidine and 100 milliliters glacial acetic acid. The mixture is stirred at reflux for 16 hours, then cooled. A solid precipitates and is removed by filtration and dried. The filtrate is poured into water, and the solution is neutralized with sodium bicarbonate. A solid precipitate is collected and is found to be identical to the precipitate obtained from the acetic acid. Both solids are combined for a total yield of 51.5 grams (100% of theory based on benzidine) of p,p'-bis(3,4-dicarbethoxy-2,5-dimethylpyrryl) biphenyl.

| Analysis | Calculated: C 65.12; H, 4.65; N, 5.43 |
|---|---|
| for $C_{36}H_{40}O_8N_2$ | found: C 64.4 ; H 4.71; N 5.45 |

EXAMPLE 5

Preparation of p,p'-bis(3,4-dicarboxy-2,5-dimethylpyrryl) biphenyl:

To a 500 milliliter, three-neck flask equipped with stirrer and Dean-Stark trap with condenser are added 51.5 grams (0.08 mole) p,p'-bis(3,4-dicarbethoxy-2,5-dimethylpyrryl) biphenyl and 250 milliliters of 95% aqueous ethanol. The mixture is heated to reflux to dissolve the tetraester, and 16 grams (0.4 mole) of sodium hydroxide are added to effect hydrolysis. In a few minutes a brown precipitate is formed which is redissolved by the addition of a small amount of water. The ethanol is removed by azeotropic distillation while the liquid level is maintained by the addition of water to the reaction flask. When no more ethanol remains, the brown, aqueous residue is treated with decolorizing charcoal and acidified by the addition of HCl to give a tan-colored precipitate. This solid is filtered off and dried in a vacuum oven. Yield: 41.3 g. (100% of theory). The infra-red spectra of this compound shows that saponification has occurred to give the tetracarboxylic acid, p,p'-bis(3,4-dicarboxy-2,5-dimethylpyrryl) biphenyl.

EXAMPLE 6

Preparation of p,p'-bis(3,4-dicarboxy-2,5-dimethylpyrryl) biphenyl, dianhydride:

Into a one-liter flask, equipped with a reflux condenser and drying tube are charged 41.2 grams (0.08 mole) of p,p'-bis(3,4-dicarboxy-2,5-dimethylpyrryl) biphenyl from Example 3 and 500 milliliters of acetic anhydride. The mixture is heated to reflux for 48 hours, then cooled. A solid precipitate is removed by filtration, washed three times with ethyl ether, and dried in a vacuum oven. The yield is 32.6 grams (85% of theory). The infra-red spectrum of this material is compatible with the structure of the dianhydride of p,p'-bis(3,4-dicarboxy-2,5-dimethylpyrryl) biphenyl.

EXAMPLES 7 AND 8

Preparation of other dianhydrides:

In a similar manner, other tetraesters of the present invention are prepared in which the benzidine is replaced by p-phenylenediamine, ethylenediamine and di-(paraaminophenyl) ether, hydrolyzed and then dehydrated to the dianhydrides. The infra-red spectra of the resulting dianhydrides are compatible with the proposed structures for these compounds.

EXAMPLE 9

Preparation of poly-(amic acid) from benzidine and p,p'-bis(3,4-dicarboxy-2,5-dimethylpyrryl) biphenyl, dianhydride:

To a 500 milliliter flask equipped with stirrer and reflux condenser are added 10.8 grams of p,p'-bis(3,4-dicarboxy-2,5-dimethylpyrryl) biphenyl, dianhydride from Example 4, 4.6 grams benzidine and 100 milliliters dimethyl formamide. The mixture is stirred for five hours at 40°–75°C., then allowed to stand at room temperature for about 72 hours. A solid material is removed by filtration and washed three times with water and dried in a vacuum oven at 140°C. Yield: 13.5 grams of a golden-brown solid which is soluble in 97% $H_2SO_4$. The infra-red spectrum indicates that this material is a polymer containing both amide and carboxylic acid substituents. The product also contains some polyimide.

Analysis Calculated for:

$(C_{40}H_{32}O_6N_4)_n$: C 72.3; H 4.8; N 8.45 poly(amic acid)

$(C_{40}H_{28}O_4N_4)_n$: C 76.5; H 4.5; N 8.95 polyimide
Found: C 72.4; H 5.2; N 8.95

Inherent viscosity (0.1 g/100 ml 97% $H_2SO_4$ at 25°C.) = 0.39. Thermogravimetric analysis shows a 0.15% weight loss up to 325°C. and then levels off with no further weight loss until 460°C.

EXAMPLE 10

A sample of the polymer product from Example 9 is heated in refluxing N,N-dimethylacetamide at 160°C. for five hours and shows a similar yield of a product having the following analysis: C 76.5; H 5.72; N8.45. The infra-red spectrum is compatible with the polyimide structure. The polymer has an inherent viscosity (0.1 g/100 ml 97% $H_2SO_4$ at 25°C.) of 0.29. Thermogravimetric analysis shows only a small weight loss up to 470°C.

In a further experiment, the reaction of Example 9 is repeated except that the reaction is conducted at 100°C. Analysis of the resulting product indicates that it is substantially polyimide.

EXAMPLES 11–14

The same procedure as in Example 10 is used in preparing other polyimides using the analogous diamine compounds for values of R" and R'" as shown in Table I below. The percent conversions indicate useful reactivities, and analysis for carbon, hydrogen, and nitrogen in the products indicate that the thecretical reactions are closely followed. The inherent viscosities in 97% sulfuric acid at 25°C. indicate good clarity in solution. Thermogravimetric analyses show the temperatures at which these polyimides suffer 5% weight loss. All indicate utility in high-temperature applications.

TABLE I

| Ex. No. | ARYL COMPONENTS OF DIAMINES R'' | R''' | POLYMERIZATION CONDITIONS Solvent | Temp. °C. | Conv. % |
|---|---|---|---|---|---|
| 11 | —C₆H₄—C₆H₄— (biphenylene) | —C₆H₄—C₆H₄— (biphenylene) | N,N-dimethyl acetamide | 160 | 89 |
| 12 | —C₆H₄—SO₂—C₆H₄— | —C₆H₄—SO₂—C₆H₄— | dimethyl formamide | 150 | 96 |
| 13 | —C₆H₄—O—C₆H₄— | —C₆H₄—O—C₆H₄— | N,N-dimethyl acetamide | 130 | 98 |
| 14 | —C₆H₄— | —C₆H₄— | N,N-dimethyl acetamide | 130 | 87 |

| Ex. No. | POLYIMIDE ANALYSIS I.V.* | TGA Analysis (5% wt. loss) | FT. % COMPOSITION OF POLYIMIDES Calculated C | H | N | Analyzed O | H | N |
|---|---|---|---|---|---|---|---|---|
| 11 | 0.29 | 470°C | 76.4 | 4.5 | 8.93 | 76.5 | 5.72 | 8.87 |
| 12 | 0.38 | 455 | 63.4 | 3.7 | 7.41 | 62.8 | 4.1 | 7.23 |
| 13 | 0.48 | 440 | 72.8 | 4.3 | 8.48 | 68 | 4.35 | 8.05 |
| 14 | 0.16 | 420 | 69.4 | 5.8 | 11.58 | 67.7 | 5.42 | 10.4 |

*Inherent viscosities determined on (0.1 gram of sample)/(100 milliliter 97% $H_2SO_4$) at 25°C.

EXAMPLE 15

Preparation of a poly-(imidazopyrrolone from p,p'-bis(3,4-dicarboxy-2-dimethylpyrryl) biphenyl and 3,3'-diaminobenzidine To a 500 milliliter flask equipped with a stirrer and reflux condenser are added 10.8 grams of p,p'-bis(3,4-dicarboxy-2,5-dimethylpyrryl) biphenyl, 5.4 grams of 3,3'-diaminobenzidine, and 200 grams of polyphosphoric acid. The mixture is stirred for three hours at 80°C., then allowed to stand at room temperature for approximately 60 hours. A solid material separates, and is removed by diluting the reaction mixture with water, followed by filtration and washing with water. The yield of product was 14.1 grams. A sample placed on a hot plate at about 400°C. does not perceptibly change color or melt for more than two hours.

The invention has been described herein with reference to certain specific aspects. However, the invention is not to be considered as limited thereto as obvious variations will occur to those skilled in the art.

We claim:

1. A polyimide consisting esentially of recurring units of the formula:

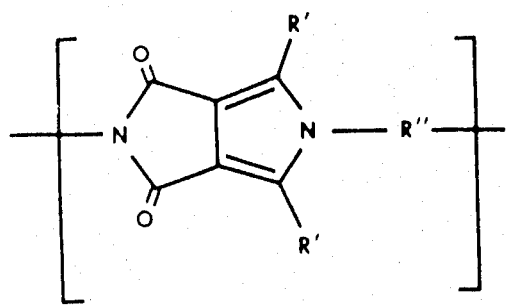

wherein R' is H or an alkyl substituent of between about 1 and about 10 carbons; and R'' is an arylene substituent, biarylene substituent or diarylene substituent, and the inherent viscosity of said polyimide is between about 0.15 and about 3.0 as determined with solutions of 0.1 gram of polymer/100 milliliters 97% $H_2SO_4$ at 25°C.

2. The polyimide according to claim 1, wherein R' is a lower alkyl substituent of between about 1 and about 6 carbon atoms.

3. The polyimide according to claim 2 wherein R' is methyl and R'' is phenylene, biphenylene, diphenylene ether, diphenylene sulphone or diphenylene amine.

4. The polyimide according to claim 3 wherein R'' is biphenylene and the inherent viscosity is between about 1.5 and about 3.0 as determined with solutions of 0.1 gram of polymer/100 milliliters 97% $H_2SO_4$ at 25°C.

5. The process for producing a polyimide of claim 1, which comprises heating a N-substituted pyrrole-3,4-diester having the formula:

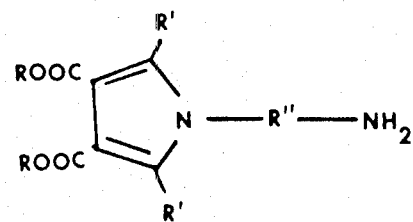

wherein R is a lower alkyl substituent of between about 1 and about 6 carbon atoms; R' is H or an alkyl substituent of between 1 and about 10 carbon atoms; and R'' is an arylene substituent, biarylene substituent or a diarylene substituent to a temperature above its melting point, said temperature being between about 125°C. and about 300°C. and continuing said reaction at said temperature for a time sufficient to form a polymer.

6. The process of claim 5 wherein the product is held at the reaction temperature for from about 30 minutes to about 10 hours.

7. The process according to claim 5 wherein said heating is conducted at a temperature of between 150°C. and about 200°C. in an inert condensation promoting, high-boiling solvent which is liquid at said indicated temperatures.

8. The process according to claim 7 wherein the inert high-boiling solvent is dimethylformamide, N,N-dimethylacetamide, dimethyl sulfoxide, hexamethylphosphoramide or an aromatic hydrocarbon.

9. A process for preparing a polyimide having an inherent viscosity of between about 0.15 and about 3.0, as determined with solutions of 0.1 gram of polymer/100 milliliters 97% $H_2SO_4$ at 25°C., said polyimide consisting essentially of recurring units of the formula

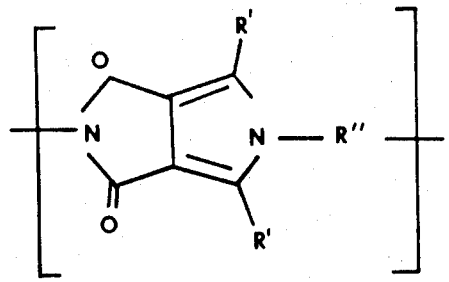

said process comprising heating a mixture of about equamolar amounts of a 2,3-diacylsuccinic diester of the formula

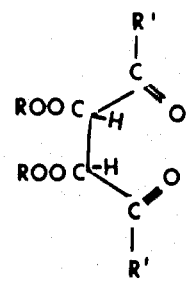

and a diamine of the formula
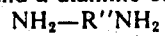
$NH_2—R''NH_2$ at a temperature of between about 125°C. and about 300°C., wherein said temperature is above the melting point of the corresponding N-substituted pyrrole 3,4-diester for a time sufficient to form a polymer where, in the above formula, R is an organic ester forming substituent of between one and ten carbon atoms, R' is H or an alkyl substituent between about 1 and about 10 carbon atoms and R'' is an arylene substituent, biarylene substituent, or a diarylene substituent.

* * * * *